Aug. 7, 1951  J. G. HAGER  2,563,331
STOCK FEEDING APPARATUS.
Filed April 21, 1950  2 Sheets-Sheet 1
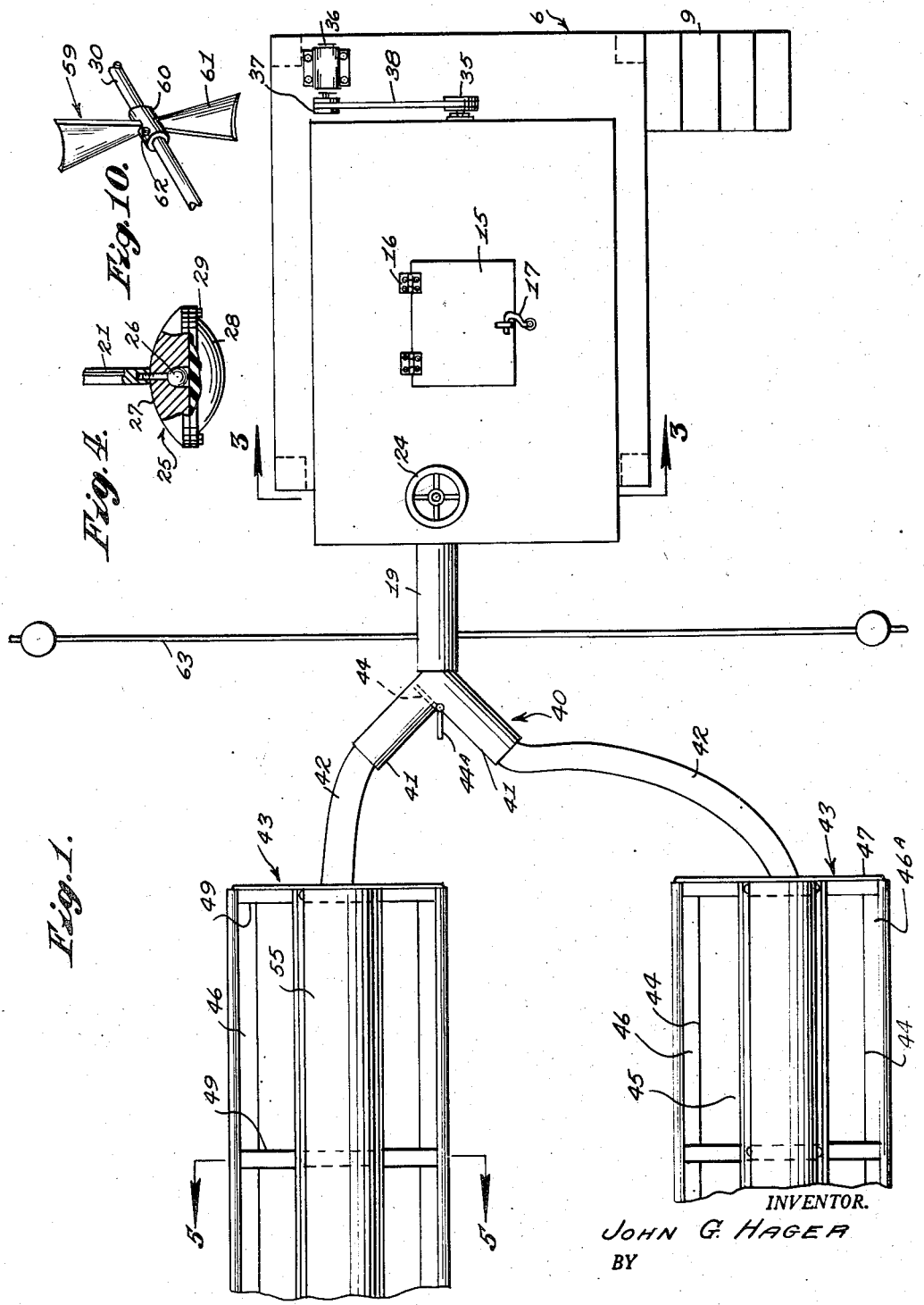
INVENTOR.
JOHN G. HAGER
BY
McMorrow, Berman & Davidson
ATTORNEYS

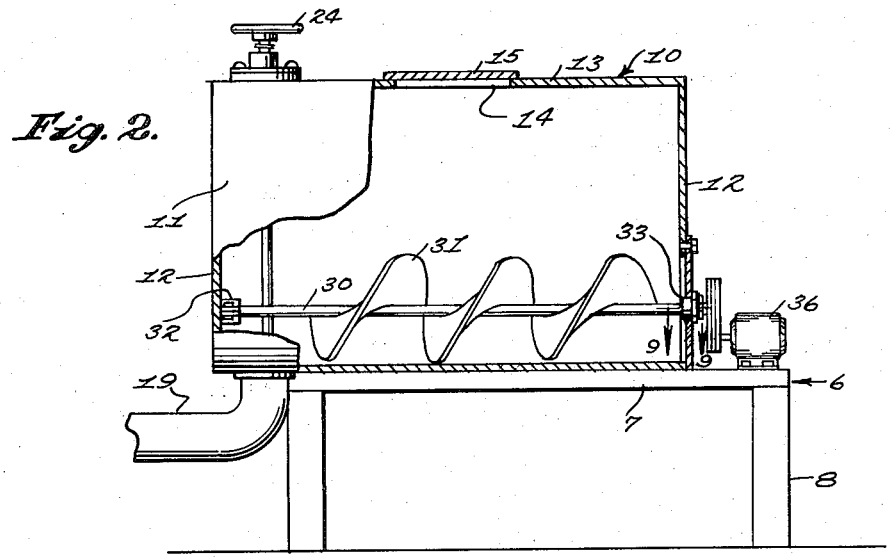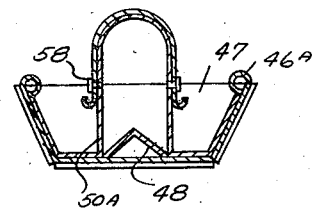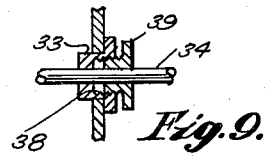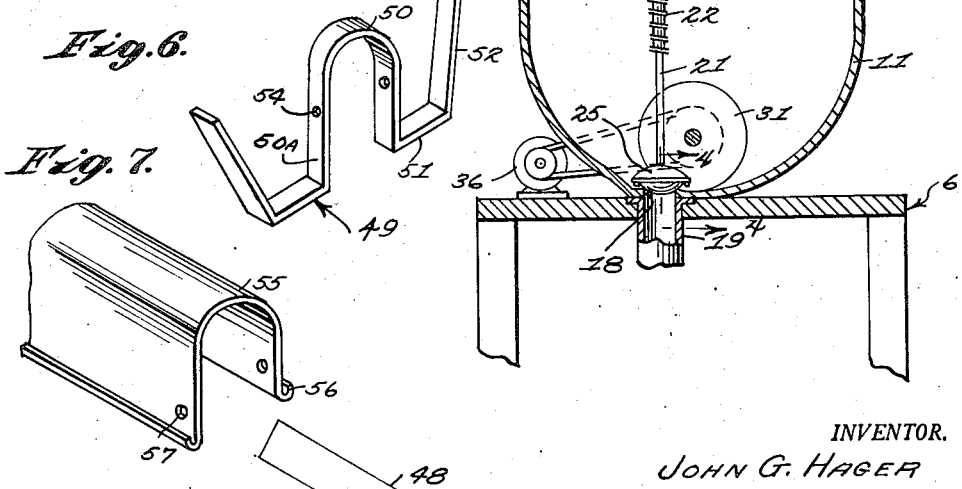

Patented Aug. 7, 1951

2,563,331

UNITED STATES PATENT OFFICE 2,563,331

STOCK FEEDING APPARATUS

John G. Hager, Huron, Kans.

Application April 21, 1950, Serial No. 157,357

3 Claims. (Cl. 119—51)

This invention relates to an apparatus for feeding hogs and other livestock.

It is an object of the invention to provide a hog feeding apparatus embodying a plurality of feeding troughs located at a distance from a tank containing a supply of feed such as swill, the tank being situated a sufficient distance above the level of the troughs to provide a gravity feed of the swill from the supply tank through an outlet pipe and distributor pipes and into the troughs.

A further object of the invention is to provide, in an apparatus of the above-mentioned type, a feed supply tank including a means for mixing the feed and moving the same toward the outlet pipe for facilitating the discharge of the feed from the tank.

A further object of the invention is to provide in a hog feeding device of the above-mentioned character a feed supply tank having a control valve for controlling the discharge of feed from the tank, and a plurality of feed troughs supplied by a distributor pipe system having a control valve for selective filling of the individual feed troughs.

A further object of the invention is to provide in an apparatus of this character, power means located externally of the feed tank for driving the mixing and feeding means located within the tank.

A further object of the invention is to provide a novel feed trough structure which is especially adapted for use in a hog feeding apparatus of the present type.

With these and other objects in view, the invention consists of the novel construction, arrangement and combination of parts hereinafter described, illustrated in the accompanying drawing and pointed out in the claims hereto appended, it being understood that various changes in the form, proportion and minor details of construction may be resorted to without departing from the spirit or sacrificing any of the advantages of the invention.

In the drawing:

Figure 1 is a plan view of the invention;

Figure 2 is a side elevation of the device, partly in section;

Figure 3 is a section on the line 3—3 of Figure 1;

Figure 4 is a detail of the valve head construction, shown partly in section;

Figure 5 is a section on line 5—5 of Figure 1;

Figure 6 is a perspective view of a bracket employed in the trough construction;

Figure 7 is a perspective view of a portion of a hood member employed in the trough construction;

Figure 8 is a perspective view of a portion of a ridge member employed in the trough construction;

Figure 9 is a section on line 9—9 of Figure 2; and,

Figure 10 is a perspective view of a modified form of feeding and mixing means employed in the feed tank.

Referring now more particularly to the accompanying drawing, the reference character 10 designates generally a feed supply tank adapted to contain stock feed such as swill. The tank 10 is formed preferably of sheet metal and includes a portion 11 bent in a substantially U-shape to provide bottom and side portions for the tank. End portions 12 are secured at each end of the portion 11, and the tank is also provided with a top portion 13. The top portion 13 is provided with an aperture 14 through which the swill is poured into the tank. A cover 15 is provided for the opening 14, the cover 15 being hinged to the top 13, as shown at 16. The top 13 is provided with a latch member 17 for securing the cover 15 in closed position.

The tank 10 is mounted on an elevated platform 6 which includes a top portion 7, legs 8 and steps 9. The platform 6 supports the tank at a proper elevation to allow for gravity feed of the swill from the tank 10 to the feed troughs to be described later.

At the bottom of the tank 10 and at one end thereof, there is provided an opening forming a valve seat 18 communicating with an outlet pipe 19. A valve 20 is provided for controlling the flow of feed through the outlet pipe 19. A valve 20 is provided for controlling the flow of feed through the outlet pipe 19. Valve 20 includes a valve shaft 21 provided with a threaded portion 22 which engages the internally threaded sleeve 23 fixed to the top 13 of the tank. Valve shaft 21 has a hand wheel 24 fixed thereto at the top end thereof. A valve head 25 is swivelly attached to the bottom end of valve shaft 21 by means of a screw 26. The valve head 25 includes a circular body portion 27 to which is attached a rubber facing 28 secured thereto by screws 29. The rubber facing 28 is in the form of a disc having its lower surface of convex shape. The rubber disc 28 is adapted to engage and close the valve seat 18 and thus shut off the supply of feed to the outlet pipe 19. By rotating the hand wheel 24 the valve head 25 may be raised or lowered to open or close the outlet pipe 19. The valve head 25 does not rotate with the valve shaft 21 when engaging with or disengaging from the valve seat 18, due to the swivel connection 26.

At the bottom of the tank 10 there is mounted for rotation a shaft 30 carrying a mixing and feeding or propelling member 31 of the screw or auger type. The shaft 30 is mounted in bearings 32 and 33 fixed in the ends 12 of the tank 10. The shaft 30 extends through the bearing member 33 and the corresponding end wall 12 of the tank to project externally of the tank, as shown at 34. A pulley 35 is mounted on the end portion 34 of the shaft 30.

The shaft 30 is adapted to be rotated by an electric motor 36. The shaft of the electric motor 36 is provided with a driving pulley 37. A belt 38 engages pulleys 35 and 37 for connecting the electric motor in driving relation to the shaft 30.

The projecting end 34 of the shaft 30 is provided with a shaft packing to avoid leakage from the tank at this point. As shown in Figure 9 the bearing member 33 is provided with packing 38, and a packing nut 39 for tightening the packing 38 about the shaft 34 to prevent leakage along the shaft.

As shown in Figure 1, the outlet pipe 19 is provided with a coupling member 40. The coupling member 40 includes two distributor pipe sections 41. Each of the pipe sections 41 has attached thereto a flexible distributor pipe 42. The distributor pipes 42 are connected at their outer ends to feed troughs 43. The coupling member 40 has pivotally mounted therein the valve 44, provided with an operating handle 44a. The valve 44 is movable into positions closing either one of the pipe sections 41, so that the feed may be selectively delivered to either of the distributor pipes 42.

The fed troughs 43 are of identical construction. These troughs are formed preferably of sheet metal. An elongated sheet of metal is bent along the two longitudinal and parallel lines 44 to form the flat bottom portion 45 and the outwardly and upwardly directed flat side portions 46 of the trough. The upper edges of the side portions 46 are inwardly rolled or curled as shown at 46a to eliminate sharp edges and prevent injury to animals using the trough. The troughs are provided with end portions 47 secured thereto in any suitable manner. Bracket members 49 are provided for mounting a hood 55 on the feed trough 43. Bracket members 49 are formed of metal strips and are bent to the shape shown in Figure 6. The sloping outer portions 52 of the bracket members 49 are disposed at a greater angle to the vertical than the sloping sides 46 of the feed trough, so that when the bracket members are pushed into the trough, the ends 53 of the bracket members will snap into position under the rolled edges 46a of the trough, as shown in Figure 5. The bracket members will thus be retained in position in the trough without requiring any bolts or other securing means, since the sloping portions 52 of the bracket members tend to spring outwardly and thus will lie snugly against the sides 46 of the feed trough. The bottom portions 51 of the bracket members 49 rest on the bottom 45 of the feed trough.

A ridge member 48 is provided for directing the feed to each side of the trough. Ridge member 48 is V-shaped in cross section, as shown in Figure 8, and is adapted to be laid on the bottom of the feed trough. Ridge member 48 extends longitudinally of the feed trough for the full length thereof and along the center line thereof. The ridge member 48 is placed between the leg portions 50a of the U-shaped portion 50 of the bracket member, and thus retained in position.

The bracket 49 is provided with threaded apertures 54. The U-shaped intermediate portions 50 of the bracket 49 are adapted to have mounted thereon a hood 55. Hood 55 is preferably formed from an elongated sheet of metal bent into a U-shape as shown in Figure 7. The two edges of the hood 55 are rolled or curled as shown at 56 to prevent injury to animals feeding at the trough. The hood 55 is provided with apertures 57 for receiving bolts 58 by means of which the hood 55 is attached to the brackets 49. The rolled edges 56 of the hood 55 extend slightly below the top edges of the trough, as shown in Figure 5. The hood 55 serves to prevent interference between animals feeding at each side of the trough.

The troughs 43, when fitted with the hood 55 and ridge member 48, are especially adapted for hog feeding. If it is desired to feed cattle, the hood 55 and ridge member 48 are removed from the feed trough. The hood can be removed merely by prying one of the outer portions 52 of each bracket member inwardly to displace the end 53 thereof from under the rolled edge 46a. The hood 55, together with its supporting bracket members 49, can then be lifted out of the feed trough. Also, the ridge member 48 can be lifted out of the feed trough, since it merely rests on the bottom of the trough. To replace the hood 55 in the feed trough, it is merely necessary to push the hood into the trough. The ends 53 of the bracket members 49 will snap into place under the rolled edges 46a and thus retain the hood in position in the trough.

The flexible distributor pipes 42 are adapted to be inserted within one end of each of the hoods 55 between the hoods and the upper edge of the end portions 47 of the troughs. The feed will thus be delivered into the troughs and will fall upon the ridge member 48 which will direct the feed to each side of the trough. Obviously, additional troughs may be provided and feed supplied thereto by additional coupling members 40 and additional distributor pipes 42.

Figure 10 shows a modified form of mixing and feeding device 59 which may be mounted on the shaft 30 in place of the screw or auger member 31. The mixing device 59 is a screw propeller having a hub portion 60 and blades 61. The hub portion 60 is provided with a set screw 62 for fixing the member 59 in any desired position along the shaft 30. It is intended that several of these members 59 be fixed on the shaft 30 in spaced relation to each other.

The troughs 43 are enclosed by fencing 63 for confining the stock while feeding at the troughs. The supply tank 10 is located externally of the enclosure for the troughs as indicated in Figure 1.

In use, the swill or other feed is poured into the supply tank 10 through the aperture 14. The electric motor 36 is started to drive the mixing and feeding means 31 or 59. This mixes the swill or other feed and feeds or propels the same toward the outlet pipe 19. By operating the hand wheel 24, the valve 20 may be opened and the feed will be discharged through the outlet pipe 19 and through the distributor pipes 42 to the troughs 43. When one trough is full, the valve 44 may be adjusted to direct the feed to the other trough for filling the same, after which the valve 20 may be closed to stop the flow of feed to the troughs. The rolled edges 46a and 56 on the troughs serve to prevent injury to the animals feeding in the troughs. The hood 55 serves to prevent interference between animals feeding from opposite sides of each trough.

I claim:

1. A hog feeding device comprising an elevated support, a horizontally disposed supply tank having a pair of spaced end walls, a U-shaped bottom, and a closed top, mounted on said support, an outlet pipe positioned exteriorly of said tank and having one end projecting vertically through said bottom of said tank adjacent to and spaced from one of said end walls of the latter, a horizontally disposed screw positioned within said tank adjacent the bottom of the latter and rotatably supported in the end walls of said tank, a valve positioned within said tank in alignment with the projecting end of said outlet pipe and mounted in the closed top of said tank for up and down movement into and out of seating engagement with the projecting end of said outlet pipe, means exteriorly of said tank and operatively connected to said screw to effect rotation of the latter, a feed trough positioned at a level below and spaced from said tank and connected to the other end of said outlet pipe, and hand actuable means exteriorly of and operatively connected to said valve for effecting the up and down movement of the latter.

2. A hog feeding device comprising an elevated support, a horizontally disposed supply tank having a pair of spaced end walls, a U-shaped bottom, and a closed top, mounted on said support, an outlet pipe positioned exteriorly of said tank and having one end projecting vertically through said bottom of said tank adjacent to and spaced from one of said end walls of the latter, a horizontally disposed screw positioned within said tank adjacent the bottom of the latter and rotatably supported in the end walls of said tank, a valve positioned within said tank in alignment with the projecting end of said outlet pipe and mounted in the closed top of the tank for up and down movement into and out of seating engagement with the projecting end of said outlet pipe, means exteriorly of said tank and operatively connected to said screw to effect rotation of the latter, a coupling member including a pair of distributor pipe sections connected to the other end of said outlet pipe, a distributor pipe having one end connected to each of said pipe sections, a pair of spaced feed troughs positioned at a level below and spaced from said tank and each connected to the other end of the adjacent distributor pipes, and hand actuable means exteriorly of and operatively connected to said valve for effecting the up and down movement of the latter.

3. A hog feeding device comprising an elevated support, a horizontally disposed supply tank having a pair of spaced end walls, a U-shaped bottom, and a closed top, mounted on said support, an outlet pipe positioned exteriorly of said tank and having one end projecting vertically through said bottom of said tank adjacent to and spaced from one of said end walls of the latter, a horizontally disposed screw positioned within said tank adjacent the bottom of the latter and rotatably supported in the end walls of said tank, a valve positioned within said tank in alignment with the projecting end of said outlet pipe, a vertically disposed screw threaded shaft positioned within said tank having one end secured to said valve and having the other end projecting exteriorly of the closed end of said tank and rotatably mounted in the closed top of said tank for up and down movement into and out of sealing engagement with the projecting end of said outlet pipe, means exteriorly of said tank and operatively connected to said screw to effect rotation of the latter, a feed trough positioned at a level below and spaced from said tank and connected to the other end of said outlet pipe, and hand actuable means exteriorly of and operatively connected to the projecting end of said shaft for effecting the up and down movement of said valve.

JOHN G. HAGER.

REFERENCES CITED

The following references are of record in the file of this patent:

UNITED STATES PATENTS

| Number | Name | Date |
|---|---|---|
| 426,245 | Craig | Apr. 22, 1890 |
| 750,726 | Stevens | Jan. 26, 1904 |
| 1,458,058 | Hoppes | June 5, 1923 |
| 1,467,951 | Rosenberger | Sept. 11, 1923 |
| 1,467,979 | Paisolli | Sept. 11, 1923 |
| 1,783,092 | Lewis | Nov. 25, 1930 |
| 1,980,247 | Backes | Nov. 13, 1934 |
| 1,997,029 | Abendroth | Apr. 9, 1935 |
| 2,081,947 | McCornack | June 1, 1937 |
| 2,243,896 | Cupples | June 3, 1941 |
| 2,494,147 | Trelease et al. | Jan. 10, 1950 |
| 2,522,449 | Inman | Sept. 12, 1950 |

FOREIGN PATENTS

| Number | Country | Date |
|---|---|---|
| 629,844 | Germany | May 14, 1936 |
| 109,948 | Austria | Feb. 28, 1940 |